United States Patent
Wu et al.

(10) Patent No.: US 8,902,530 B1
(45) Date of Patent: Dec. 2, 2014

(54) DECISION DIRECTED AND NON-DECISION DIRECTED LOW FREQUENCY NOISE CANCELATION IN TURBO DETECTION

(71) Applicant: SK hynix memory solutions inc., San Jose, CA (US)

(72) Inventors: Zheng Wu, San Jose, CA (US); Jason Bellorado, San Jose, CA (US); Naveen Kumar, San Jose, CA (US); Marcus Marrow, San Jose, CA (US)

(73) Assignee: SK hynix memory solutions inc., San Jose, CA (US)

( * ) Notice: Subject to any disclaimer, the term of this patent is extended or adjusted under 35 U.S.C. 154(b) by 43 days.

(21) Appl. No.: 13/826,028

(22) Filed: Mar. 14, 2013

Related U.S. Application Data

(60) Provisional application No. 61/618,418, filed on Mar. 30, 2012.

(51) Int. Cl.
*G11B 5/02* (2006.01)
*G11B 20/24* (2006.01)

(52) U.S. Cl.
CPC .................................. *G11B 20/24* (2013.01)
USPC ............. 360/53; 714/152; 714/746; 714/769; 714/780; 714/824; 375/254; 375/341; 375/346

(58) Field of Classification Search
None
See application file for complete search history.

(56) References Cited

U.S. PATENT DOCUMENTS

2006/0107176 A1* 5/2006 Song ............................. 714/758
2007/0195912 A1* 8/2007 Yang et al. ..................... 375/341

* cited by examiner

*Primary Examiner* — Wayne Young
*Assistant Examiner* — Brian Butcher
(74) *Attorney, Agent, or Firm* — Van Pelt, Yi & James LLP

(57) ABSTRACT

A set of decisions is determined based at last in part on a set of samples. For a given sample in the set of samples, a low frequency noise estimate is estimated based at least in part on (1) at least some samples from the set of samples and (2) at least some decisions from the set of decisions. A reduced noise sample is generated by removing the low frequency noise estimate from the given sample.

19 Claims, 12 Drawing Sheets

DECISION DIRECTED AND NON-DECISION DIRECTED LOW FREQUENCY NOISE CANCELATION IN TURBO DETECTION

CROSS REFERENCE TO OTHER APPLICATIONS

This application claims priority to U.S. Provisional Patent Application No. 61/618,418 entitled DECISION DIRECTED AND NON-DECISION DIRECTED LOW FREQUENCY NOISE CANCELLATION IN TURBO DETECTION filed Mar. 30, 2012 which is incorporated herein by reference for all purposes.

BACKGROUND OF THE INVENTION

Low frequency noise is sometimes present in signals read back from magnetic storage (e.g., hard disk drive systems). For example, low frequency noise may be introduced by the read head of the storage system. One existing technique to remove low frequency noise involves reading the same location of the magnetic storage (e.g., the same sector) multiple times. Performing multiple reads of the same location is time consuming because the magnetic disk must complete multiple rotations in order for the read head to pass over that location multiple times. New and faster techniques for removing low frequency noise would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
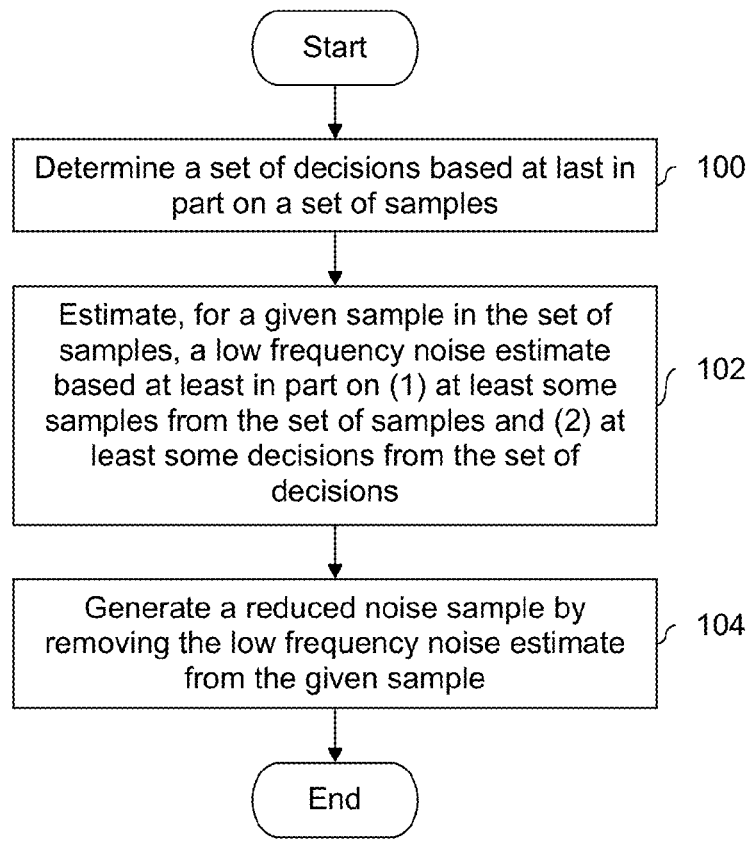
FIG. 1 is a flowchart illustrating an embodiment of a process for performing decision directed low frequency noise removal.

FIG. 1 is a flowchart illustrating an embodiment of a process for performing decision directed low frequency noise removal. In the example shown, a reduced noise sample is generated, for example for a sample at a given index or location within a signal. In some embodiments, the process is repeated for multiple samples at various indices within a signal. In some embodiments, the process is performed only in the event where error correction decoding fails at least once. In some embodiments, some other noise removal process is performed before decision directed low frequency noise removal is attempted.

At 100, a corresponding set of decisions is determined for a set of samples in a signal. For example, samples which comprise a sector in hard disk storage may be input to a detector (e.g., a soft output Viterbi detector) and the detector outputs decisions. As used herein, $y_k$ is a sample at index or location k and $\hat{b}_k$ is a decision at index k.

At 102, for a given sample in the set of samples, low frequency noise is estimated based at least in part on (1) at least some samples from the set of samples and (2) at least some decisions from the set of decisions. In one example, a sample at index k is represented as:

$$y_k = \sum_{i=0}^{N-1} T_i b_{k-i} + n_k + L_k \qquad (1)$$

where $T_i$ is the target coefficient of the $i^{th}$ of N taps (e.g., in an equalizer), $b_{k-i}$ is the written (i.e., actual) bit on magnetic storage, $n_k$ is noise consisting of media noise and white noise, and $L_k$ is low frequency noise which is removed using this technique. Using Equation (1), the following estimate for low frequency noise at index k may be obtained:

$$\hat{L}_k = \frac{1}{T}\left(\sum_{j=-\frac{T}{2}}^{\frac{T}{2}}\left(y_{k-j} - \sum_{i=0}^{N-1} T_i \hat{b}_{k-j-i}\right)\right). \quad (2)$$

In Equation (2), T is a window size (expressed in number of samples) used for averaging, $\hat{b}$ are the decisions used in the estimate, and y are the samples used in the estimate. Because the noise term n in Equation (1) is zero mean, it is attenuated by the averaging in the above $\hat{L}_k$ computation and, since the low frequency noise L is assumed to vary little during the average window, only the low frequency noise remains in the $\hat{L}_k$ estimate.

In some embodiments, $T=T_{opt}$ where the window size is an optimized window size where various values of T are simulated and the value of T which best removes low frequency noise is selected. In some embodiments, T is large enough such that the average of T noise samples has negligible standard deviation but is small enough so that the low frequency noise L has a non-zero average. An example of how the window size is selected is described in further detail below.

At 104, a reduced noise sample is generated by removing the low frequency noise estimate from the given sample. For example, $$\tilde{y}_k = y_k - \hat{L}_k \quad (3)$$

where $\tilde{y}_k$ is a reduced noise sample at an index or location of k.

In some embodiments, the reduced noise sample is passed to an error correction decoder, such as a low-density parity check (LDPC) decoder. As described above, the process of FIG. 1 may be repeated on other samples in a signal to obtain a plurality of reduced noise samples at various indices; the other reduced noise samples at other indices may also be passed to an error correction decoder.

Figure 2:
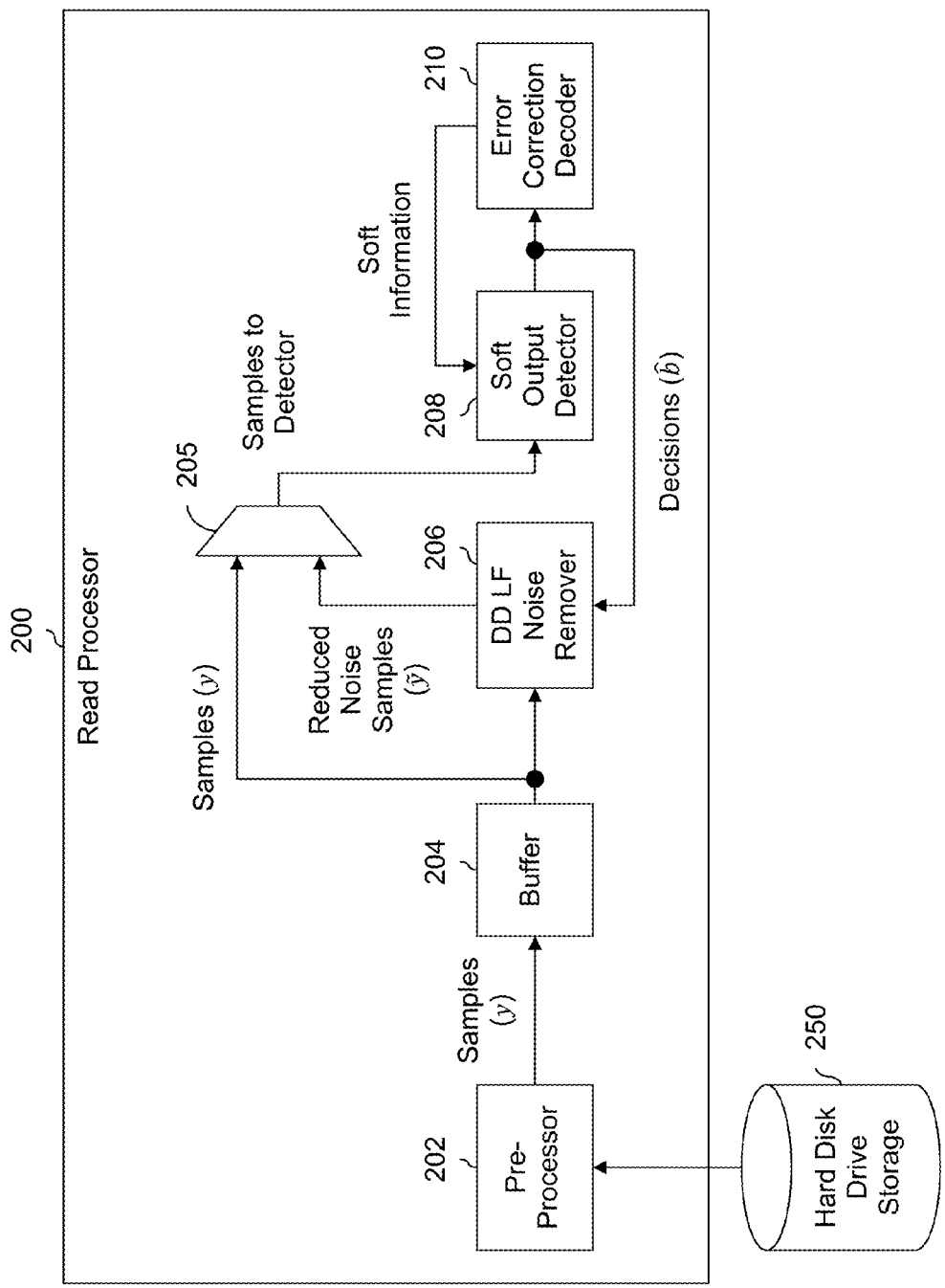
FIG. 2 is a diagram showing an embodiment of a read processor which performs decision directed low frequency noise removal.

FIG. 2 is a diagram showing an embodiment of a read processor which performs decision directed low frequency noise removal. In the example shown, various components of read processor 200 perform the process shown in FIG. 1. For clarity, some storage system components may not necessarily be shown in FIG. 2 and other figures. For example, FIG. 2 does not include a write processor which writes information to hard disk drive storage 250. This is not intended to be limiting and a system which performs the low frequency noise removal techniques described herein may include a component not shown herein (e.g., a write processor or a read processor component not shown herein). In some embodiments, read processor 200 is implemented on or includes a semiconductor device, such as an application-specific integrated circuit (ASIC) or field-programmable gate array (FPGA).

Read processor 200 retrieves stored information from hard disk drive storage 250. In this example, a read signal is passed from hard disk drive storage 250 to pre-processor 202. In various embodiments, pre-processor performs a variety of processing, including (but not limited to): analog to digital conversion, equalization, acquisition (e.g., phase and/or frequency adjustment of a sampling clock, etc.). In some embodiments, pre-processor 202 includes an equalizer and/or filter with N taps and each of the N taps has a coefficient $T_i$ for the $i^{th}$ tap.

Samples at various indices (e.g., y) are passed from pre-processor 202 to buffer 204. In one conceptual example, buffer 204 manages samples according to sector and outputs samples for a next sector when so instructed. In some embodiments, buffer 204 is a first in, first out buffer. In some other embodiments, buffer 204 can be accessed out of order. In this example, buffer 204 stores samples for a given sector until that sector is successfully processed by soft output detector 208 and error correction decoder 210, at which point those samples are deleted from buffer 204.

During a first global iteration, the samples (y) for a given sector bypass decision directed low frequency noise remover 206 via multiplexer 205. In some embodiments, in the first global iteration, other decisions are used, such as from a low-latency detector (e.g., in addition to or as an alternative to samples (y) as is described above). Multiplexer 205 passes the samples (y, which have not had noise removal processing performed on them) at this first global iteration to soft output detector 208 which generates decisions ($\hat{b}$) using the samples. This is one example of step 100 in FIG. 1. In some embodiments, soft output detector 208 is a soft output Viterbi detector and the decisions output by detector 208 include log-likelihood ratio (LLR) values.

Decisions ($\hat{b}$) are passed from soft output detector 208 to error correction decoder 210. In one example, error correction decoder 210 is a low-density parity check (LDPC) decoder. A single global iteration includes processing by both soft output detector 208 and error correction decoder 210, and so when error correction decoder 210 performs error correction decoding on the decisions, it is still the first global iteration.

In this example, if error correction decoder 210 is unable to successfully complete decoding during the first global iteration, decision directed low frequency noise remover 206 is used to remove low frequency noise from the second global iteration onwards. In various embodiments, decision directed low frequency noise removal begins at various points. In some embodiments, a programmable register is used to set the global iteration at which decision directed low frequency noise removal begins.

In the second global iteration, decision directed low frequency noise remover 206 estimates or calculates low frequency noise. In this particular example, Equation (2) is used to calculate $\hat{L}_k$, which takes as input samples $y_{k-T/2}$ through $y_{k+T/2}$ and decisions $\hat{b}_{k-(T/2)-(N-1)}$ through $\hat{b}_{k+T/2}$ where T is the window size and N is the number of taps of the equalization target in an equalizer. This is one example of step 102 in FIG. 1. The samples (y) at indices $$k - \frac{T}{2}$$

through $$k + \frac{T}{2}$$

come from buffer 204, and the decisions ($\hat{b}$) at indices k−T/2−(N−1) through $$k + \frac{T}{2}$$

come nom son output detector 208 . . . ]

Once the low frequency noise estimate for a given index is determined, decision directed low frequency noise remover 206 removes it from the sample at the same index to produce a reduced noise sample (e.g., $\tilde{y}_k = y_k - \hat{L}_k$, as described in Equation (3)). This is an example of step 104 in FIG. 1.

In this second global iteration, multiplexer 205 selects the reduced noise samples ($\tilde{y}$) from decision directed low frequency noise remover 206. The reduced noise samples are thus input to soft output detector 208. During this second global iteration, not only are the samples which are input to the detector different (e.g., $\tilde{y}$ instead of y), but soft information from error correction decoder 210 is available for use by soft output detector 208, which was not available during the first global iteration. After processing by soft output detector 208, error correction decoder 210 begins a second decoding attempt, which comprises part of the second global iteration.

Figure 3:
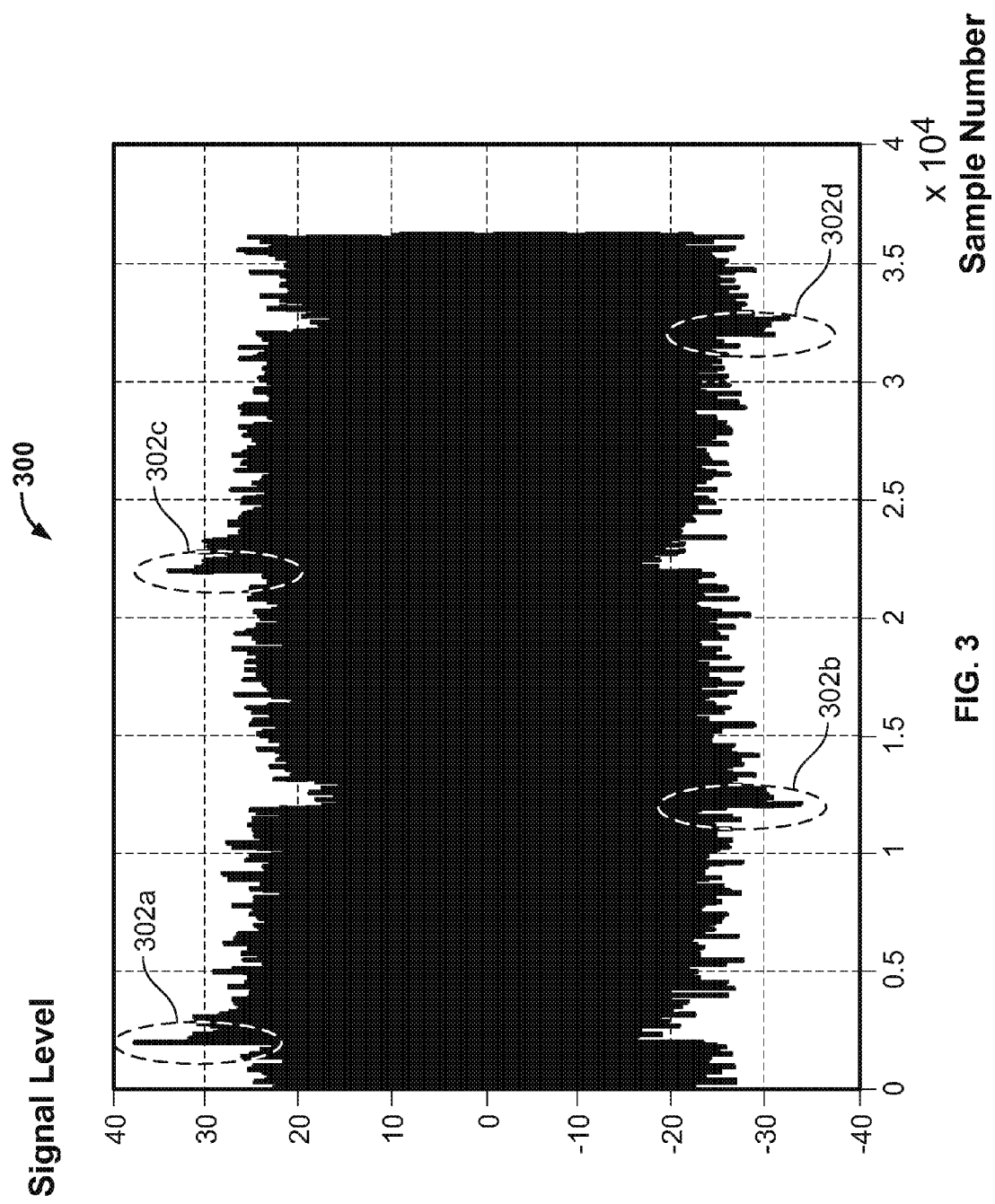
FIG. 3 is a diagram showing an embodiment of a signal with baseline instability.

FIG. 3 is a diagram showing an embodiment of a signal with baseline instability. In the example shown, diagram 300 shows a signal with 4 baseline instability events. A baseline instability event is characterized by a large step up in DC offset in the signal (the signal envelope then decays due to the high pass filter present in the analog front end). See, for example, signal portions 302a-302d. The following figure shows performance improvement with decision directed low frequency noise removal for various numbers of baseline instability events per sector.

Figure 4:
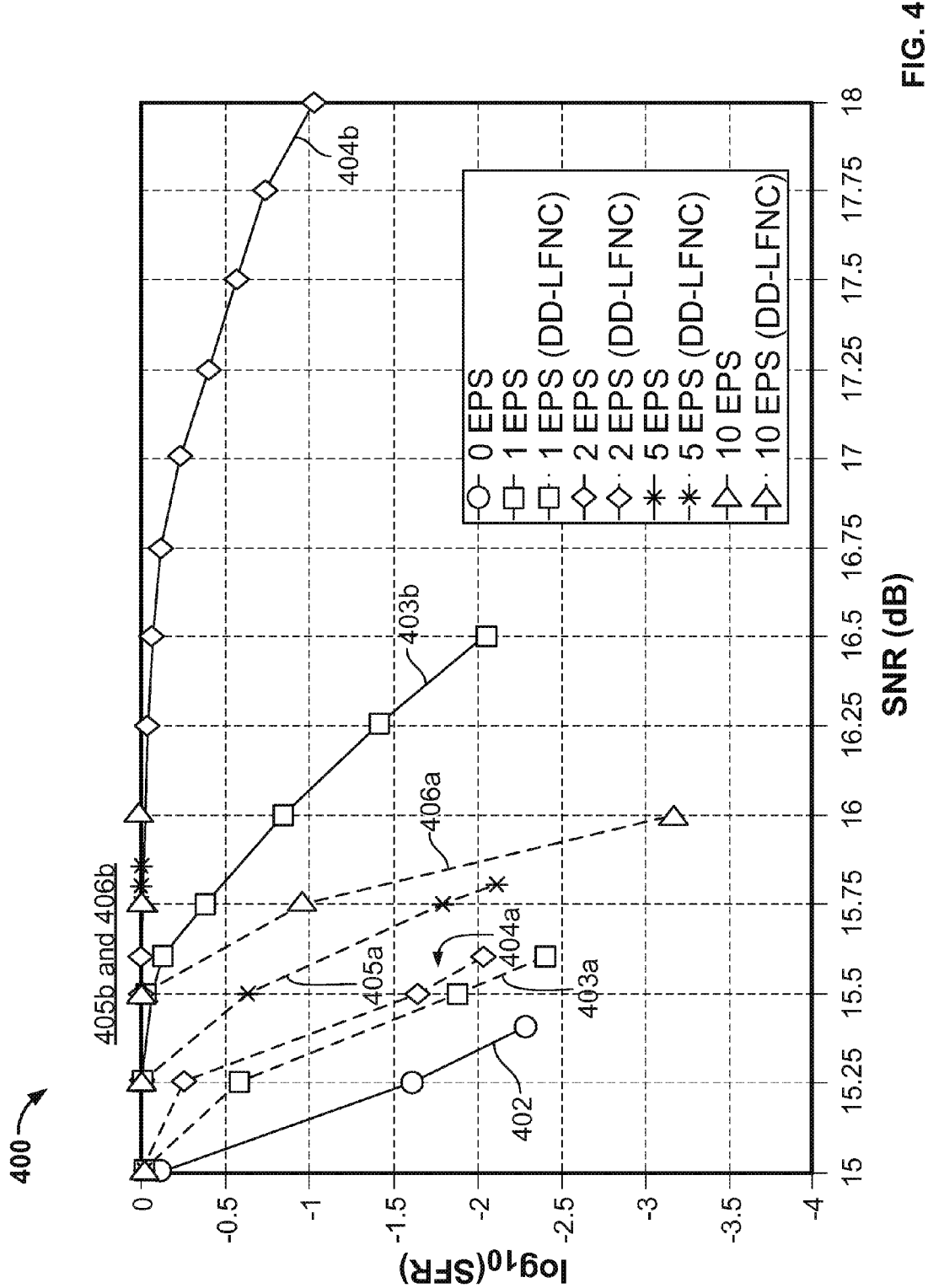
FIG. 4 is a diagram showing an embodiment of performance improvement with decision directed low frequency noise removal.

FIG. 4 is a diagram showing an embodiment of performance improvement with decision directed low frequency noise removal. In the example shown, graph 400 shows the $\log_{10}$ (sector failure rate) as a function of the signal to noise ratio. Plot 402 shows the performance when there is no baseline instability. Plots 403a and 403b show performance with one event of baseline instability per sector, with and without decision directed low frequency noise removal, respectively. Plots 404a and 404b show performance with two events of baseline instability per sector, with and without decision directed low frequency noise removal, respectively. Plots 405a and 405b show performance with 5 events of baseline instability per sector, with and without decision directed low frequency noise removal, respectively. Plots 406a and 406b show performance with 10 events of baseline instability per sector, with and without decision directed low frequency noise removal, respectively. In this example, the magnitude of the jump in a baseline instability event is 40% of the amplitude of the signal. As is shown in diagram 400, decision directed low frequency noise removal improves sector failure rate.

In addition to the performance improvement shown, another benefit to decision directed low frequency noise removal is that it is much faster than some other noise removal techniques. For example, some other techniques rely upon reading the same sector over and over again in order to get multiple reads of the same sector. This is very time consuming because the amount of time for a magnetic disk to complete a full rotation is much longer than the amount of time to perform the decision directed noise removal technique described above.

Although decision directed low frequency noise removal is useful, there may be a situation in which some other low frequency noise removal technique is more attractive. Decision directed low frequency noise removal relies (as its name implies) on decisions and so if the quality of the decisions is poor, performance suffers. Returning to FIG. 3, there is typically a burst of errors at baseline instability events 302a-302d. Should the number of errors and/or the proximity of errors to each other (e.g., in baseline instability events 302a-302d) exceed the capability of the soft output detector, the quality of decisions generated will be poor. The following figures describe a non-decision directed low frequency noise removal technique in which decisions are not used. Since decisions are not used, the performance of non-decision directed low frequency noise removal may be better than decision directed low frequency noise removal when the quality of decisions is poor (e.g., at 302a-302d).

Figure 5:
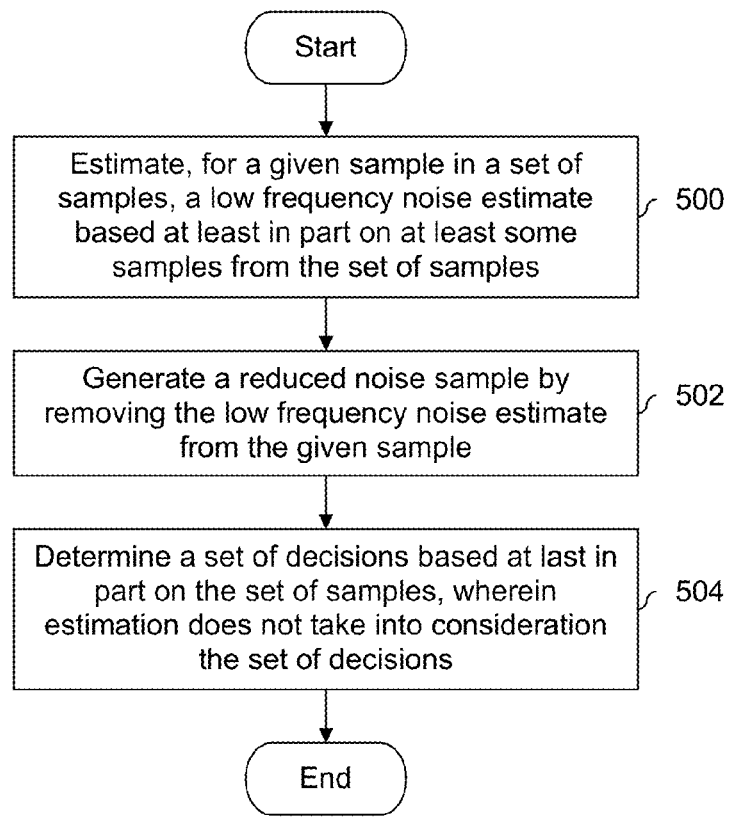
FIG. 5 is a flowchart illustrating an embodiment of a process for performing non-decision directed low frequency noise removal.

FIG. 5 is a flowchart illustrating an embodiment of a process for performing non-decision directed low frequency noise removal. In various embodiments, non-decision directed low frequency noise removal is used as an alternative to or in combination with decision directed low frequency noise removal. In the example shown, decisions are not used to estimate low frequency noise, and so the technique may perform better than decision directed low frequency noise removal when the quality of decisions is poor.

At 500, a low frequency noise estimate is estimated for a given sample in a set of samples based at least in part on at least some samples from the set of samples. For example:

$$\hat{L}_k = \frac{1}{T}\left(\sum_{j=-\frac{T}{2}}^{\frac{T}{2}} (y_{k-j})\right). \qquad (4)$$

where T is the window size (as above in Equation (2)). Note that Equation (4) does not use decisions ($\hat{b}$) in its calculation for $\hat{L}_k$, hence its name of non-decision directed low frequency noise removal. Another way of describing Equation (4) is that it is an average of the samples over a window of width T. In some embodiments, the window T for non-decision directed low frequency noise removal is much longer than the window T for decision directed low frequency noise removal.

At 502, a reduced noise sample is generated by removing the low frequency noise estimate from the given sample. For example, $\tilde{y}_k = y_k - \hat{L}_k$ where $\hat{L}_k$ calculated using Equation (4).

At 504, a set of decisions is determined based at last in part on the set of samples, wherein estimation does not take into consideration the set of decisions. Decisions are not, for example, fed back from the output of a soft output detector to the input of a low frequency noise remover (unlike FIG. 2).

Figure 6:
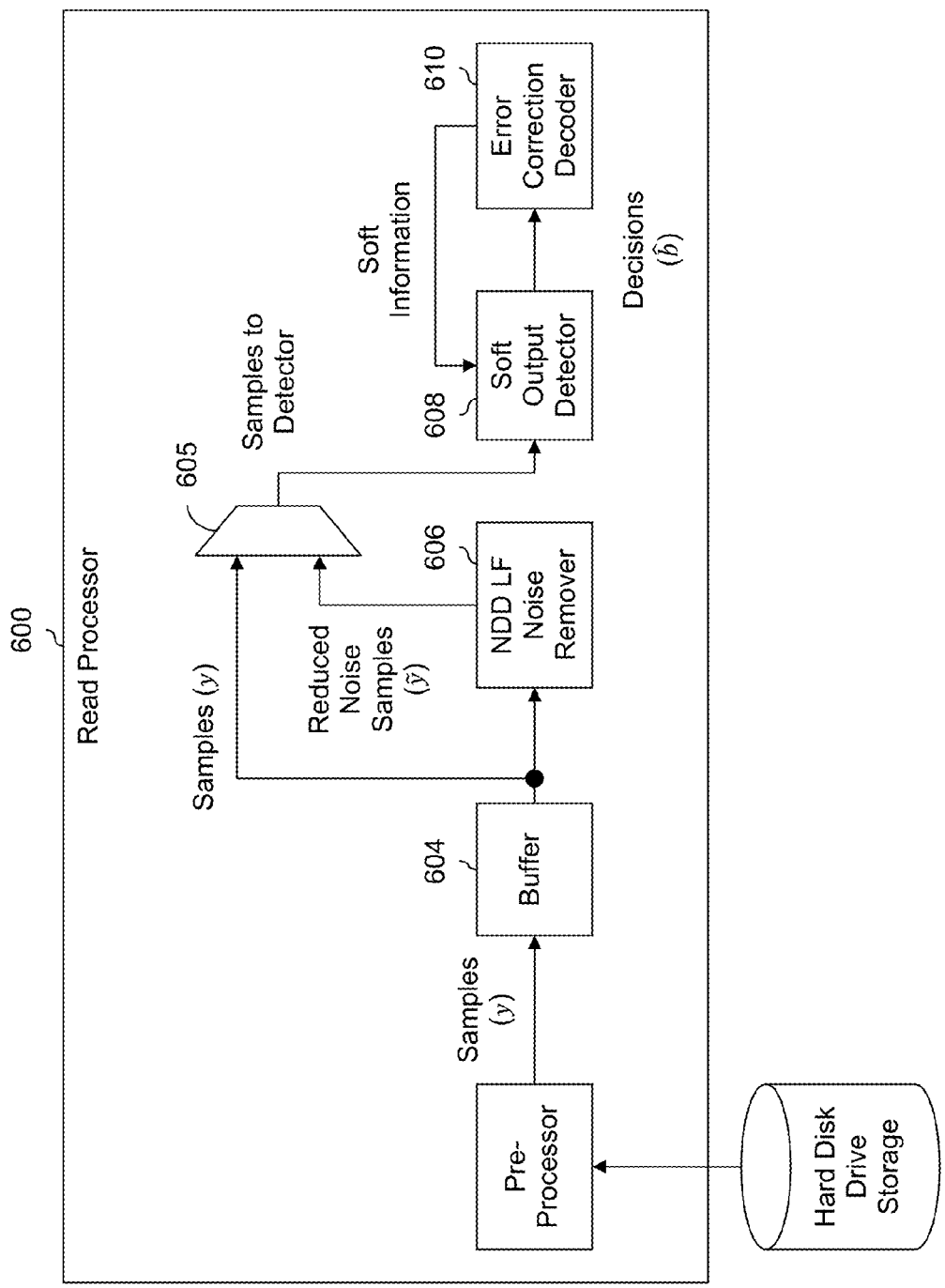
FIG. 6 is a diagram showing an embodiment of a read processor which performs non-decision directed low frequency noise removal.

FIG. 6 is a diagram showing an embodiment of a read processor which performs non-decision directed low frequency noise removal. As described above, in some embodiments, read processor 600 is implemented on or includes a semiconductor device, such as an application-specific integrated circuit (ASIC) or field-programmable gate array (FPGA). For brevity, some components or aspects of read processor 600 which are similar to read processor 200 in FIG. 2 may not necessarily be described.

As in the example of FIG. 2, multiplexer 605 is configured to pass samples (y) from buffer 604 to soft output detector 608 during a first global iteration. In the event soft output detector 608 and error correction decoder 610 are unsuccessful during the first global iteration, non-decision directed low frequency noise remover 606 is configured to generate reduced noise samples (ỹ) for the second global iteration and multiplexer 605 is configured to select the reduced noise samples. (Alternatively, in some embodiments non-decision directed low frequency noise removal is used at the first global iteration, or there is a wait of K global iterations before applying non-decision directed low frequency noise removal.)

In this example, non-decision directed low frequency noise remover 606 generates reduced noise samples (i.e., ỹ) using samples (i.e., y), without taking into consideration decisions (i.e., b̂) from soft output detector 608. Note for example, that there is no connection from the output of soft output detector 608 to the input of non-decision directed low frequency noise remover 606. As described above, a programmable register may (if desired) be used to set the global iteration at which non-decision directed low frequency noise removal begins.

For brevity, the benefits of non-decision directed noise removal are not described at length herein since they include benefits described above with respect to decision directed low frequency noise removal (e.g., both are faster than reading the same sector multiple times and both offer better performance than no low frequency noise removal at all).

Figure 7:
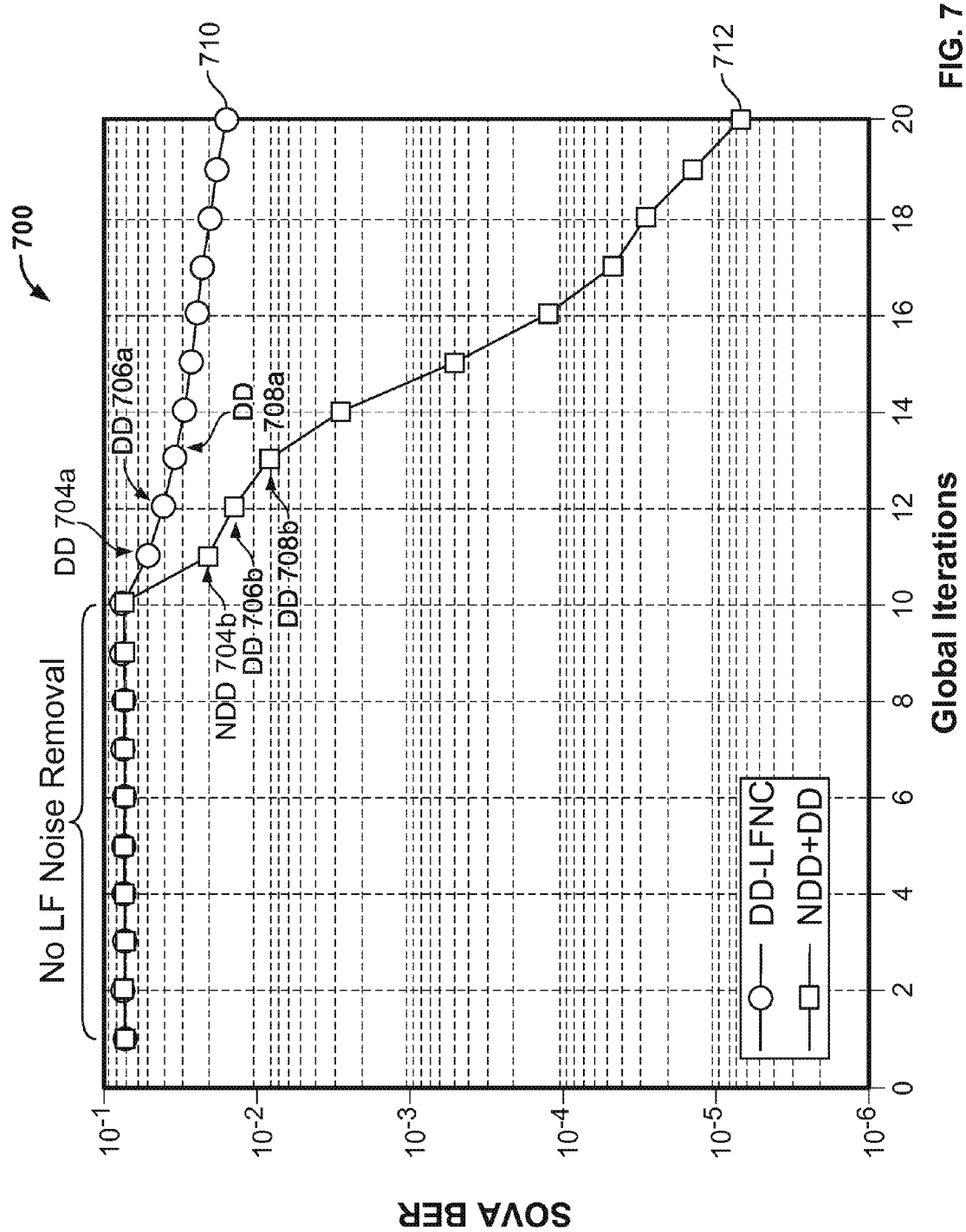
FIG. 7 is a diagram showing an embodiment of performance using both non-decision directed low frequency noise removal and decision directed low frequency noise removal.

FIG. 7 is a diagram showing an embodiment of performance using both non-decision directed low frequency noise removal and decision directed low frequency noise removal. In the example shown, diagram 700 shows bit error rate at a soft output Viterbi detector. Plots 710 and 712 show performance for the same input signal processed using different sequences of low frequency noise removal techniques. The input signal for both has 10 baseline instability events per sector.

For the first 10 global iterations, both of plots 710 and 712 do no low frequency noise technique and the bit error rate is the same. At the $11^{th}$ global iteration, decision directed low frequency noise removal is performed at 704a for plot 710 and non-decision directed low frequency noise removal is performed at 704b for plot 712. Note that even though the bit error rate is the same for the $10^{th}$ global iteration, the bit error rates diverge at the $11^{th}$ global iteration with non-decision directed plot 712 having a better bit error rate than decision directed plot 710. This may be because the quality of decisions is poor (e.g., as a result of the number of errors and/or clustering of errors from the baseline instability events) and so non-decision directed low frequency noise removal will perform better in such conditions than decision directed low frequency noise removal.

From the $12^{th}$ global iteration onwards, decision directed noise removal is performed for both of plots 710 and 712. See, for example, points 706a-706b and 708a-708b in diagram 700 which are marked "DD." Although the same low frequency noise removal technique is performed for both of plots 710 and 712 for all global iterations other than the $11^{th}$ global iteration (i.e., no low frequency noise removal for the $1^{st}$ through $10^{th}$ global iterations and decision directed low frequency noise removal for the $12^{th}$'s global iteration onwards), the rate of improvement for plot 712 is better than that of 710. The slope, for example, of plot 712 is steeper than that of plot 710. As diagram 700 shows, for at least some cases, it is desirable to perform non-decision directed low frequency noise removal for a global iteration before performing decision directed low frequency noise removal. This is particularly true for large-magnitude baseline excursions.

Figure 8:
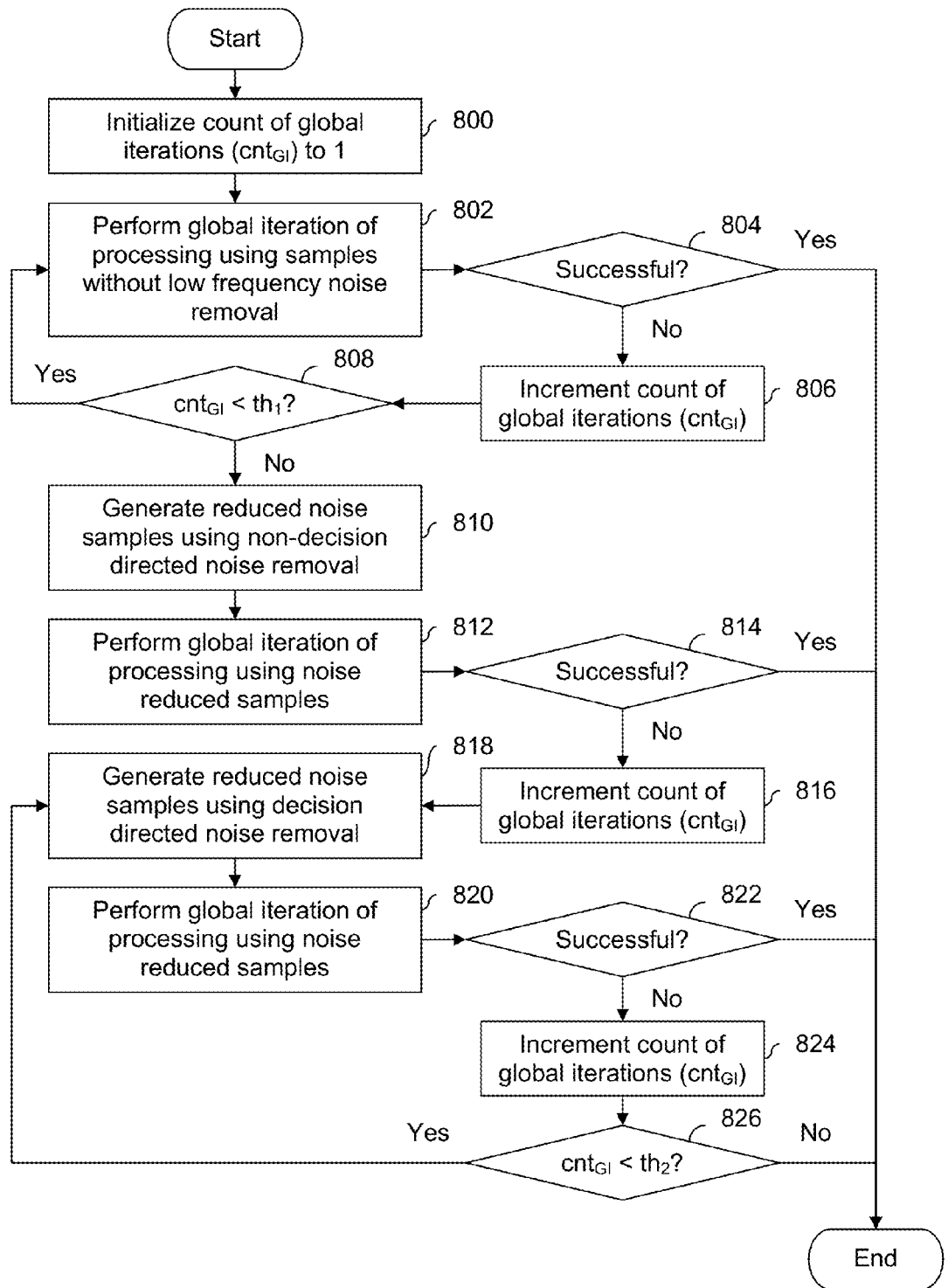
FIG. 8 is a flowchart illustrating an embodiment of a process for performing non-decision directed and decision directed low frequency noise removal after a period of no low frequency noise removal.

FIG. 8 is a flowchart illustrating an embodiment of a process for performing non-decision directed and decision directed low frequency noise removal after a period of no low frequency noise removal. The process shown may be used to perform the low frequency noise removal sequence associated with plot 712 in FIG. 7.

At 800, a count of global iterations ($cnt_{GI}$) is initialized to 1. At 802, a global iteration of processing is performed using samples without low frequency noise removal. For example, at the $1^{st}$ global iteration in FIG. 7, both of plots 710 and 712 have no low frequency noise removal. At 804, it is determined if processing is successful. For example, an error correction decoder (such as an LDPC decoder) may include a parity check and know if error correction decoding is successful. If the processing is successful, then the process ends. If not, the count of global iterations ($cnt_{GI}$) is incremented at 806. For example, after the $1^{st}$ global iteration, $cnt_{GI}$ is incremented from 1 to 2.

It is determined at 808 if the count of global iterations ($cnt_{GI}$) is less than a first threshold ($th_1$). In this example, the first threshold is used to set the global iteration at which the system switches over from no low frequency noise removal to non-decision directed low frequency noise removal. For example, to match plot 712 in FIG. 7, the first threshold would be set to 11 so that at the $11^{th}$ global iteration the process would not return to 802 where processing is performed using samples without low frequency noise removal. With a first threshold set to 11, the $1^{st}$ through $10^{th}$ global iteration would be performed using samples without low frequency noise removal (similar to plot 712 in FIG. 7).

For illustration, suppose the count of global iterations ($cnt_{GI}$) is at 11 and the first threshold is also set to 11. The result of the decision at 808 would then be "No" and reduced noise samples are generated using non-decision directed noise removal at 810. For example, the process shown in FIG. 5 may be used. At 812, a global iteration of processing is performed using the reduced noise samples. For example, this corresponds to global iteration 704b in FIG. 7.

It is determined at 814 if processing is successful. If so, the process ends. If not, the count of global iterations ($cnt_{GI}$) is incremented at 816. To continue the example above, the count of global iterations is incremented from 11 to 12. At 818, reduced noise samples are generated using decision directed noise removal at 818. For example, the process of FIG. 1 may be used. At 820, a global iteration of processing is performed using the reduced noise samples. For example, this corresponds to global iteration 706b in FIG. 7.

It is determined at 822 if processing is successful. If so, the process ends. If not, the count of global iterations ($cnt_{GI}$) is incremented at 824. For example, to continue the example from above, the count of global iterations is incremented from 12 to 13. At 826 it is determined if the count is less than a second threshold. The second threshold is used in this process to decide when to stop. For example, in FIG. 7, decoding continues using reduced noise samples from a decision directed low frequency noise remover for global iterations 12-20 in plot 712. In that example, $th_2 \geq 21$, which enables steps 818 and 820 to be repeated for a count of 12 through 20, inclusive.

Figure 9:
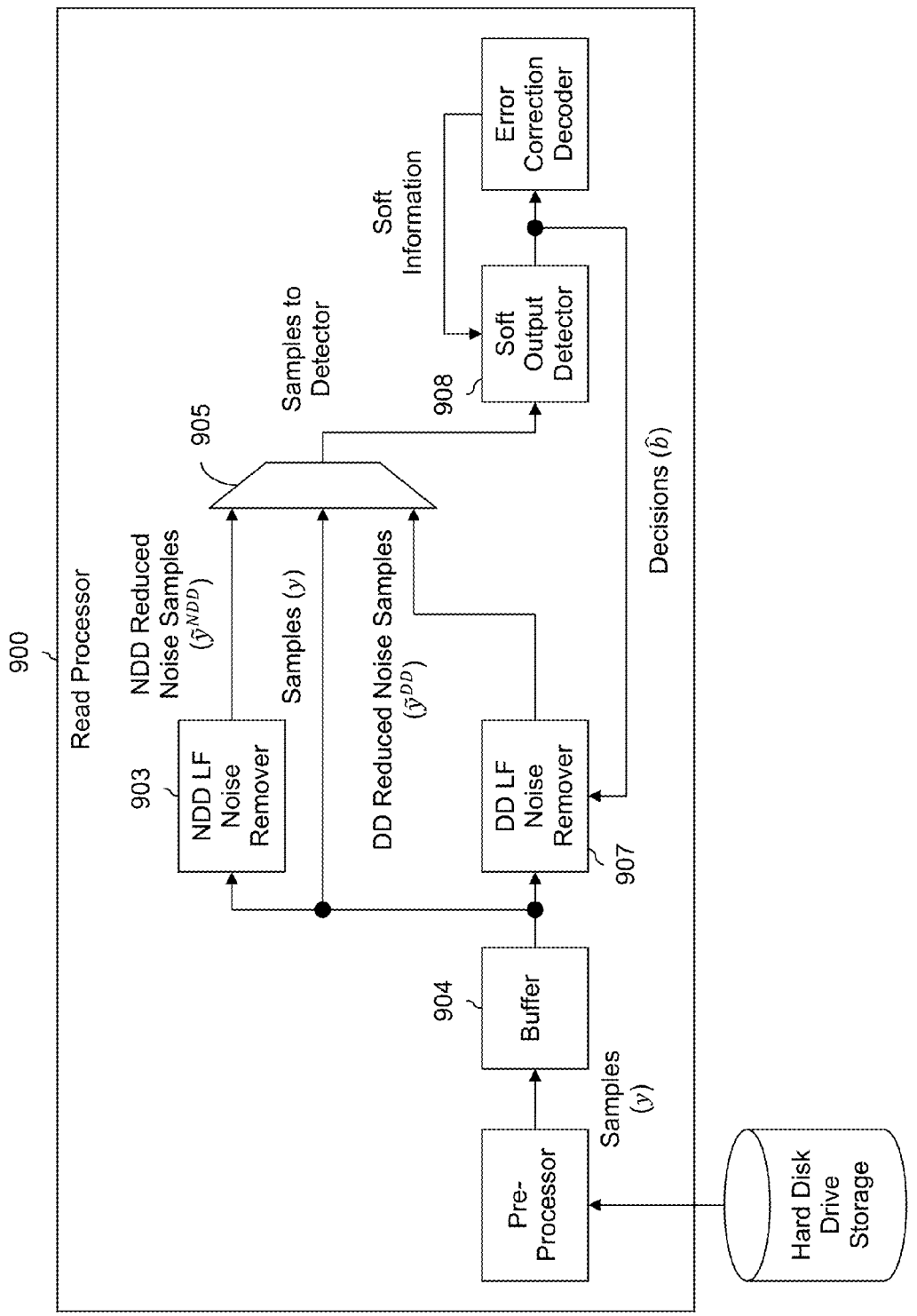
FIG. 9 is a diagram showing an embodiment of a read processor configured to perform non-decision directed and decision directed low frequency noise removal after a period of no low frequency noise removal.

FIG. 9 is a diagram showing an embodiment of a read processor configured to perform non-decision directed and decision directed low frequency noise removal after a period of no low frequency noise removal. (Note that this is merely one embodiment and in some embodiments, some type of low frequency noise removal (e.g., either decision directed or non-decision directed) is performed from the very beginning.) In the example shown, read processor 900 performs the process described in FIG. 8. Multiplexer 905 selects which samples to pass to soft output detector 908. Using plot 712 from FIG. 7 as an example, multiplexer 905 selects samples (y) from buffer 904 for the first 10 global iterations, non-decision directed reduced noise samples ($\hat{y}^{NDD}$) from non-decision directed low frequency noise remover 903 for the 11$^{th}$ global iteration, and decision directed reduced noise samples ($\hat{y}^{DD}$) from decision directed low frequency noise remover 907 for the 12$^{th}$ through 20$^{th}$ global iterations. As described above in FIG. 8, a count of global iterations and one or more thresholds may be used by multiplexer 905 to know when to switch.

Figure 10:
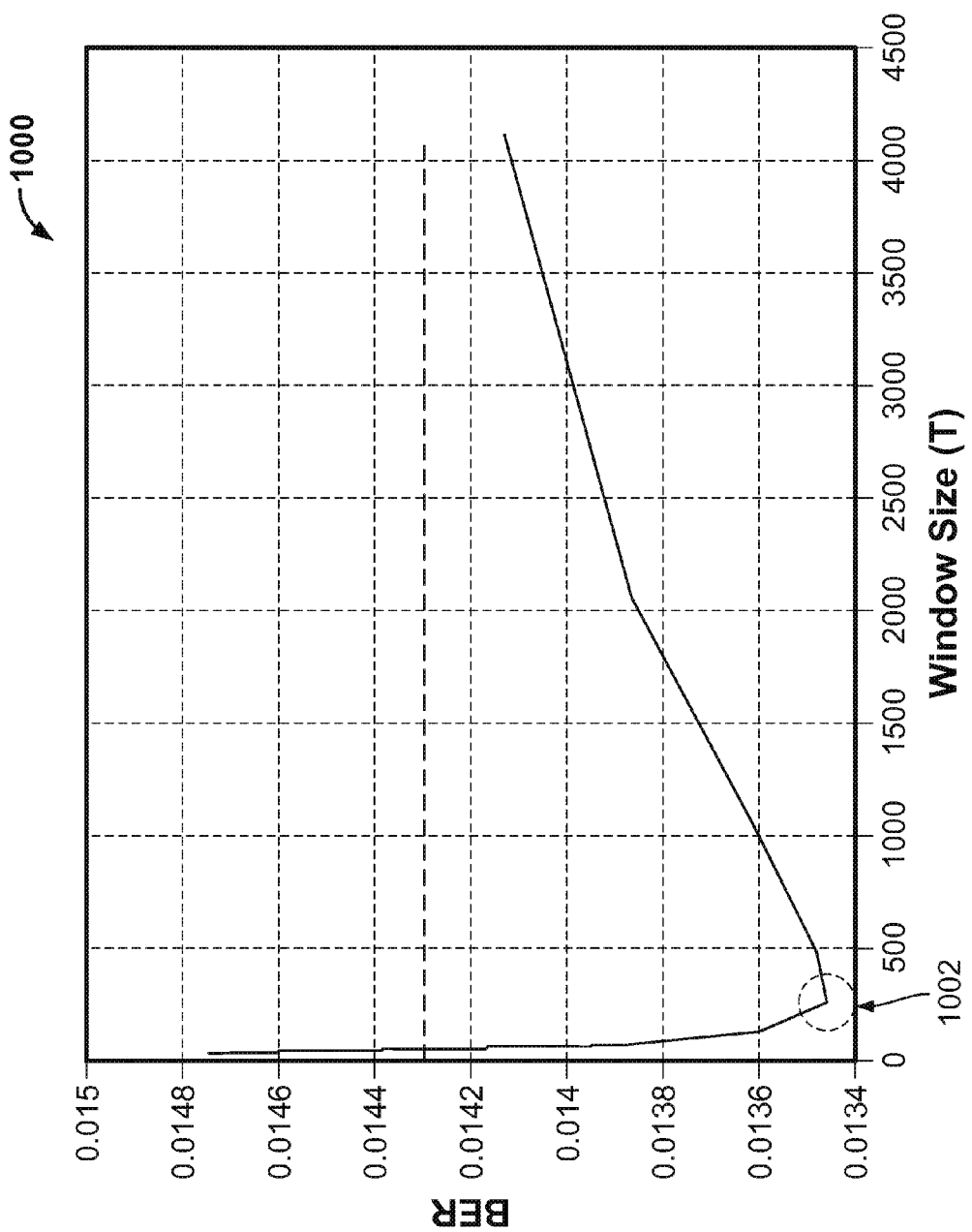
FIG. 10 is a diagram showing an embodiment for determining an optimized window size used in decision directed low frequency noise removal.

FIG. 10 is a diagram showing an embodiment for determining an optimized window size used in decision directed low frequency noise removal. As described above, in some embodiments, a window size associated with decision directed low frequency noise removal (e.g., T in Equation (2)) is an optimized window size. The example technique described herein may be used to determine an optimized window size for decision directed low frequency noise removal.

Graph 1000 shows bit error rate (e.g., at a soft output detector) as a function of window size (e.g., obtained from simulating a decision directed low frequency noise removal system at a variety of window sizes). In this particular example, global minimum 1002 shows that $T_{opt}$=250 samples. At first, the bit error rate initially decreases as window size increases. This is because a larger window size causes the noise term (n) (e.g., which contributes to the samples (y) as shown in Equation (1)) to zero out in the low frequency noise estimate shown in Equation (2). Put another way, the low frequency noise estimate ($\hat{L}_k$) in Equation (2) will have less of the noise term (n) as window size increases and will thus be more accurate.

At around a window size of 250 samples, however, the bit error rate begins to increase. This is because the low frequency noise estimate ($\hat{L}_k$) in Equation (2) will go towards zero as T increases over this region. As $\hat{L}_k$ goes towards zero, less low frequency noise is removed, thus increasing bit error rate.

In various embodiments, a system may track or otherwise manage information associated with noise reduction in a variety of ways. The following figures show some examples.

Figure 11:
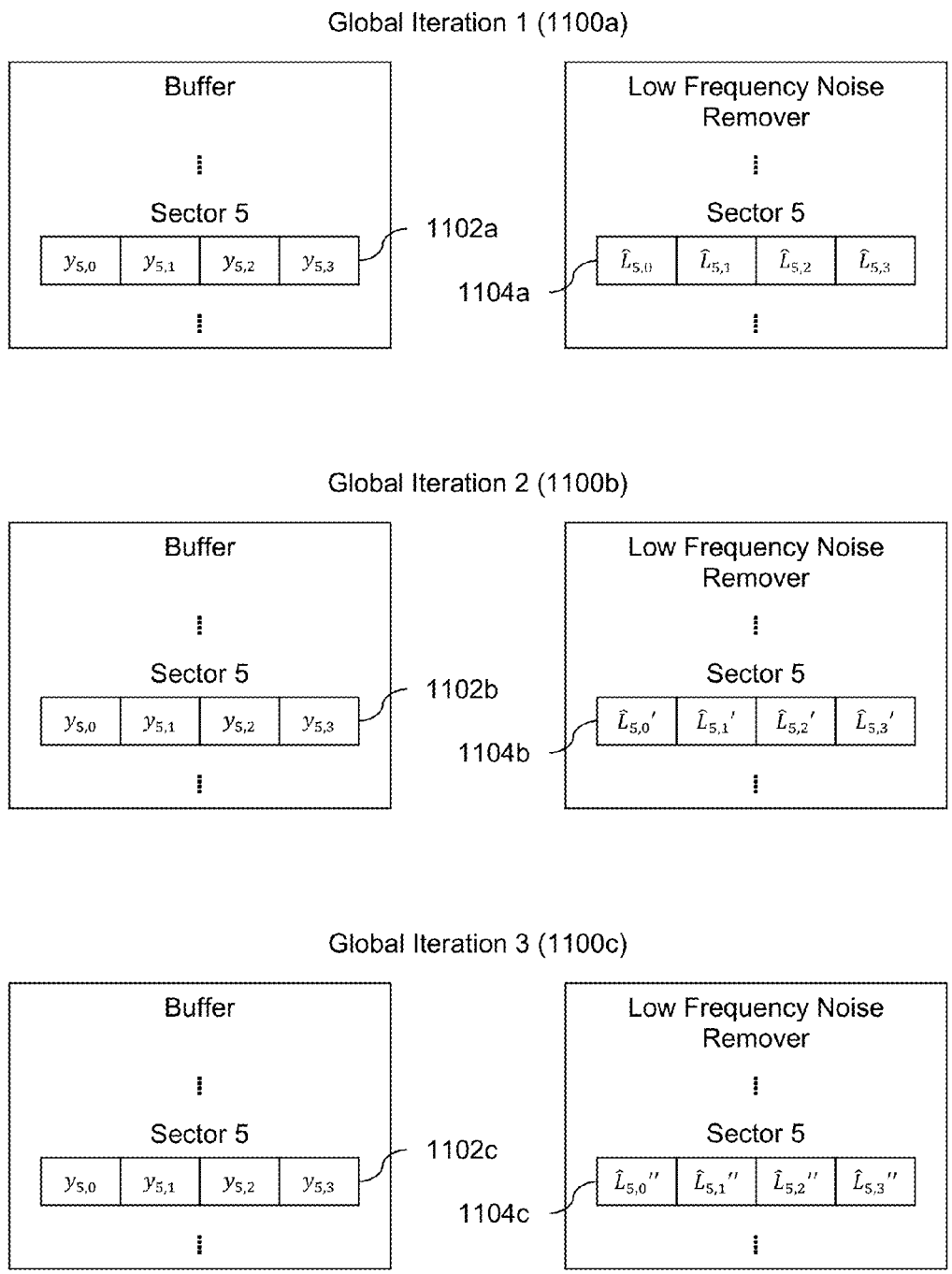
FIG. 11 is a diagram showing an embodiment where a buffer stores the original samples associated with a sector over multiple global iterations.

FIG. 11 is a diagram showing an embodiment where a buffer stores the original samples associated with a sector over multiple global iterations. In the example shown, diagrams 1100a-1100c show a low frequency noise reduction system over three global iterations. The low frequency noise removal techniques shown in diagrams 1100a-1100c may be a variety of combinations. For example, the 1$^{st}$ global iteration (1100a) may use non-decision directed low frequency noise removal, and the 2$^{nd}$ and 3$^{rd}$ global iterations (1100b-1100c) may use decision directed low frequency noise removal. Or, in another example, all three global iterations use decision directed low frequency noise removal.

In this example, a buffer stores the 4 original samples which comprise the 5$^{th}$ sector throughout global iterations 1100a-1100c. To obtain the first set of reduced noise samples (not shown) in the 1$^{st}$ global iteration (1100a), the low frequency noise estimates 1104a are removed from the (original) samples 1102a. Similarly, to obtain the reduced noise samples in the 2$^{nd}$ and 3$^{rd}$ global iterations (1100b-1100c), the second and third low frequency noise estimates (1104b and 1104c) from the original samples (1102b and 1102c). In some applications, keeping the original samples as shown herein is desirable because (for example) the original samples are available if desired (e.g., to enable re-starting the processing from scratch) and/or because some other component is already committed to keeping the original samples around.

Figure 12:
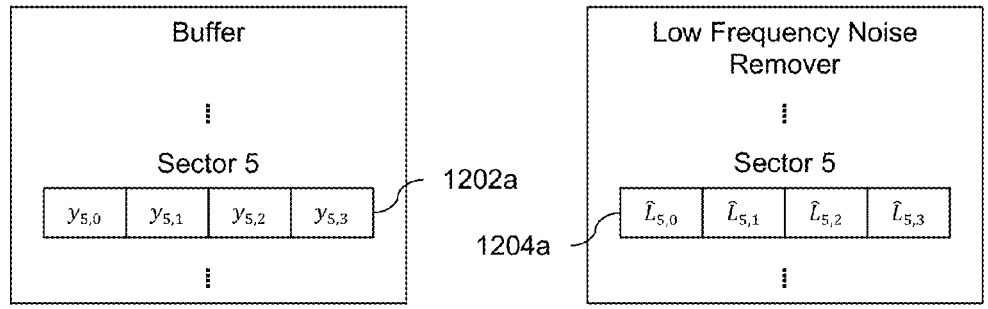
FIG. 12 is a diagram showing an embodiment where reduced noise samples are updated in-place in a buffer.
Figure 12:
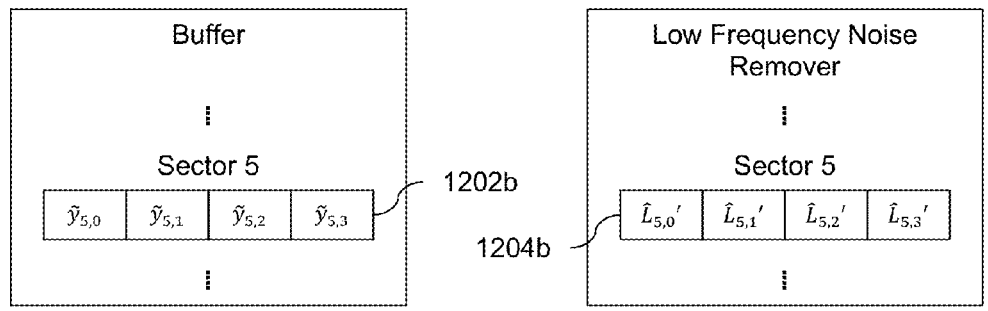
Figure 12:
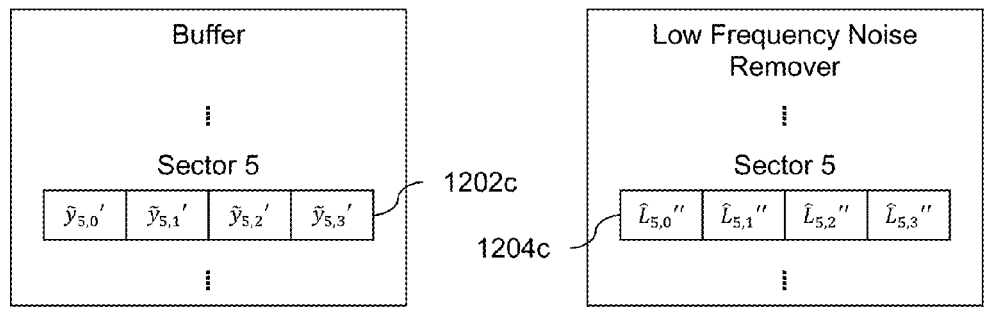

FIG. 12 is a diagram showing an embodiment where reduced noise samples are updated in-place in a buffer. Unlike the previous example, the original samples for the exemplary 5$^{th}$ sector are not stored in the buffer through global iterations 1200a-1200c. In this example, the 1$^{st}$ global iteration (1200a) matches the 1$^{st}$ global iteration (1100a) from FIG. 1. However, the samples stored in the buffer are updated in-place so that in the 2$^{nd}$ global iteration (1200b), the buffer contains reduced noise samples $\tilde{y}_{5,0}$ through $\tilde{y}_{5,3}$ (1202b) as opposed to the original samples $y_{5,0}$ through $y_{5,3}$ (e.g., 1202a) where $\tilde{y}_{5,0}=y_{5,0}-\hat{L}_{5,0}$, $\tilde{y}_{5,1}=y_{5,1}-\hat{L}_{5,1}$, $\tilde{y}_{5,2}=y_{5,2}-\hat{L}_{5,2}$, and $\tilde{y}_{5,3}=y_{5,3}-\hat{L}_{5,3}$.

Since the original samples for the 5$^{th}$ sector are not available in the 2$^{nd}$ global iterations (1200b), reduced noise samples 1202b are used to generate low frequency noise estimates 1204b. In FIGS. 1 and 5, for example, the samples used at 102 and 500 to estimate the low frequency noise estimate would have already been noise reduced at least once.

This process continues in the 3$^{rd}$ global iteration (1200c). The reduced noise samples 1202c are obtained by removing the low frequency noise estimates 1204b from reduced noise samples 1202b. Then, the low frequency noise remover uses noise reduced samples 1202c to generate low frequency noise estimates 1204c.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for generating a reduced noise sample, comprising:

using a detector to determine a set of decisions based at last in part on a set of samples;

estimating, for a given sample in the set of samples, a low frequency noise estimate based at least in part on (1) at least some samples from the set of samples and (2) at least some decisions from the set of decisions;

generating a reduced noise sample by removing the low frequency noise estimate from the given sample;

using the detector to determine a second set of decisions based at last in part on the reduced noise sample; and performing error correction decoding on the second set of decisions.

2. The method of claim 1, wherein the method is performed by a semiconductor device, including one or more of the following: an application-specific integrated circuit (ASIC) or a field-programmable gate array (FPGA).

3. The method of claim 1, wherein the detector includes a soft output Viterbi detector.

4. The method of claim 1, wherein the error correction decoding is performed by a low-density parity check (LDPC) decoder.

5. A method for generating a reduced noise sample, comprising:

using a detector to determine a set of decisions based at last in part on a set of samples;

estimating, for a given sample in the set of samples, a low frequency noise estimate based at least in part on (1) at least some samples from the set of samples and (2) at least some decisions from the set of decisions, including by using $$\hat{L}_k = \frac{1}{T}\left(\sum_{j=-\frac{T}{2}}^{\frac{T}{2}}\left(y_{k-j} - \sum_{i=0}^{N-1}T_i\hat{b}_{k-j-i}\right)\right)$$

where T is a window size, $\hat{b}$ is the decision(s) used in the estimate, y is the sample(s) used in the estimate, N is a number of taps, and $T_i$ is a target coefficient of the $i^{th}$ of the N taps; and
generating a reduced noise sample by removing the low frequency noise estimate from the given sample.

6. A system for generating a reduced noise sample, comprising:
a detector configured to:
determine a set of decisions based at last in part on a set of samples; and
determine a second set of decisions based at last in part on a reduced noise sample;
a low frequency noise remover configured to:
estimate, for a given sample in the set of samples, a low frequency noise estimate based at least in part on (1) at least some samples from the set of samples and (2) at least some decisions from the set of decisions; and
generate the reduced noise sample by removing the low frequency noise estimate from the given sample; and
an error correction decoder configured to perform error correction decoding on the second set of decisions.

7. The system of claim 6, wherein the system includes a semiconductor device, including one or more of the following: an application-specific integrated circuit (ASIC) or a field-programmable gate array (FPGA).

8. A method for generating a reduced noise sample, comprising:
estimating, for a given sample in a set of samples, a low frequency noise estimate based at least in part on at least some samples from the set of samples;
generating a reduced noise sample by removing the low frequency noise estimate from the given sample;
using a detector to determine a set of decisions based at last in part on the set of samples, wherein estimation does not take into consideration the set of decisions; and
performing error correction decoding on the set of decisions.

9. The method of claim 8, wherein the method is performed by a semiconductor device, including one or more of the following: an application-specific integrated circuit (ASIC) or a field-programmable gate array (FPGA).

10. The method of claim 8, wherein the detector includes a soft output Viterbi detector.

11. The method of claim 8, wherein the error correction decoding is performed by a low-density parity check (LDPC) decoder.

12. A method for generating a reduced noise sample, comprising:
estimating, for a given sample in a set of samples, a low frequency noise estimate based at least in part on at least some samples from the set of samples, including by averaging at least some of the samples in the set of samples;
generating a reduced noise sample by removing the low frequency noise estimate from the given sample; and
using a detector to determine a set of decisions based at last in part on the set of samples, wherein estimation does not take into consideration the set of decisions.

13. The method of claim 8, further comprising:
estimating, for the given sample in the set of samples, a second low frequency noise estimate based at least in part on (1) at least some samples from the set of samples and (2) at least some decisions from the set of decisions; and
generating a second reduced noise sample by removing the second low frequency noise estimate from the given sample.

14. A method for generating a reduced noise sample, comprising:
estimating, for a given sample in a set of samples, a low frequency noise estimate based at least in part on at least some samples from the set of samples;
generating a reduced noise sample by removing the low frequency noise estimate from the given sample;
using a detector to determine a set of decisions based at last in part on the set of samples, wherein estimation does not take into consideration the set of decisions;
estimating, for the given sample in the set of samples, a second low frequency noise estimate based at least in part on (1) at least some samples from the set of samples and (2) at least some decisions from the set of decisions;
generating a second reduced noise sample by removing the second low frequency noise estimate from the given sample;
using the detector to determine a second set of decisions based at last in part on the second reduced noise sample; and
performing error correction decoding on the second set of decisions.

15. A system for generating a reduced noise sample, comprising:
a low frequency noise remover configured to:
estimate, for a given sample in a set of samples, a low frequency noise estimate based at least in part on at least some samples from the set of samples; and
generate a reduced noise sample by removing the low frequency noise estimate from the given sample;
a detector configured to determine a set of decisions based at last in part on the set of samples, wherein estimation does not take into consideration the set of decisions; and
an error correction decoder configured to perform error correction decoding on the set of decisions.

16. The system of claim 15, wherein the system includes a semiconductor device, including one or more of the following: an application-specific integrated circuit (ASIC) or a field-programmable gate array (FPGA).

17. A system for generating a reduced noise sample, comprising:
a detector configured to determine a set of decisions based at last in part on a set of samples; and
a low frequency noise remover configured to:
estimate, for a given sample in the set of samples, a low frequency noise estimate based at least in part on (1) at least some samples from the set of samples and (2) at least some decisions from the set of decisions, including by using $$\hat{L}_k = \frac{1}{T}\left(\sum_{j=-\frac{T}{2}}^{\frac{T}{2}}\left(y_{k-j} - \sum_{i=0}^{N-1}T_i\hat{b}_{k-j-i}\right)\right)$$

where T is a window size, $\hat{b}$ is the decision(s) used in the estimate, y is the sample(s) used in the estimate, N is a number of taps, and $T_i$ is a target coefficient of the $i^{th}$ of the N taps; and generate a reduced noise sample by removing the low frequency noise estimate from the given sample.

18. A system for generating a reduced noise sample, comprising:

a low frequency noise remover configured to:
  estimate, for a given sample in a set of samples, a low frequency noise estimate based at least in part on at least some samples from the set of samples, including by averaging at least some of the samples in the set of samples; and
  generate a reduced noise sample by removing the low frequency noise estimate from the given sample; and
a detector configured to determine a set of decisions based at last in part on the set of samples, wherein the low frequency noise remover does not take into consideration the set of decisions during estimation.

19. A system for generating a reduced noise sample, comprising:

a low frequency noise remover configured to:
  estimate, for a given sample in a set of samples, a low frequency noise estimate based at least in part on at least some samples from the set of samples;
  generate a reduced noise sample by removing the low frequency noise estimate from the given sample;
  estimating, for the given sample in the set of samples, a second low frequency noise estimate based at least in part on (1) at least some samples from the set of samples and (2) at least some decisions from a set of decisions; and
  generating a second reduced noise sample by removing the second low frequency noise estimate from the given sample;
a detector configured to:
  determine the set of decisions based at last in part on the set of samples, wherein estimation does not take into consideration the set of decisions; and
  determine a second set of decisions based at last in part on the second reduced noise sample; and
an error correction decoder configured to perform error correction decoding on the second set of decisions.

* * * * *